(12) United States Patent
Oh et al.

(10) Patent No.: US 12,738,519 B2
(45) Date of Patent: Sep. 15, 2026

(54) FUEL CELL SYSTEM CAPABLE OF ADJUSTING BYPASS FLOW RATE

(71) Applicant: KOLON INDUSTRIES, INC., Seoul (KR)

(72) Inventors: Young Seok Oh, Seoul (KR); Ah Reum Lee, Seoul (KR); Ji Yoon Lee, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 529 days.

(21) Appl. No.: 18/260,795

(22) PCT Filed: Jan. 26, 2022

(86) PCT No.: PCT/KR2022/001359

§ 371 (c)(1),
(2) Date: Jul. 10, 2023

(87) PCT Pub. No.: WO2022/169177

PCT Pub. Date: Aug. 11, 2022

(65) Prior Publication Data

US 2024/0313242 A1 Sep. 19, 2024

(30) Foreign Application Priority Data

Feb. 2, 2021 (KR) ........................ 10-2021-0014737

(51) Int. Cl.
*H01M 8/04746* (2016.01)
*H01M 8/0432* (2016.01)
*H01M 8/04828* (2016.01)

(52) U.S. Cl.
CPC ... *H01M 8/04746* (2013.01); *H01M 8/04365* (2013.01); *H01M 8/04828* (2013.01)

(58) Field of Classification Search
CPC ............... H01M 8/04; H01M 8/04746; H01M 8/04365; H01M 8/04828
See application file for complete search history.

(56) References Cited

U.S. PATENT DOCUMENTS 5,532,073 A * 7/1996 Hirata ................ H01M 8/0271
429/469
6,656,620 B2 12/2003 Katagiri
(Continued)

FOREIGN PATENT DOCUMENTS

CN 110440051 A 11/2019
CN 110500439 A 11/2019
(Continued)

OTHER PUBLICATIONS

Machine Translation of: JP 2006-120340A, Uehara et al., May 11, 2006.*

(Continued)

*Primary Examiner* — Kenneth J Douyette
(74) *Attorney, Agent, or Firm* — Harvest IP Law, LLP

(57) ABSTRACT

The present invention relates to a fuel cell system capable of adjusting a bypass flow rate, which can automatically adjust the bypass flow rate according to the temperature of dry gas flowing from a blower. A fuel cell system capable of adjusting a bypass flow rate according to one embodiment of the present invention comprises: a blower for supplying dry gas through a supply flow path; a dry gas inlet for supplying at least a portion of the dry gas supplied from the blower to a membrane humidifier; a bypass flow path for supplying at least a portion of the dry gas supplied from the blower to a fuel cell stack by bypassing the membrane humidifier; and a bypass flow rate adjustment part formed in the bypass flow
(Continued)

path and for adjusting the degree of opening of the bypass flow path according to the temperature of the dry gas flowing from the blower.

7 Claims, 3 Drawing Sheets

(56) References Cited

U.S. PATENT DOCUMENTS

| | | | | |
|---|---|---|---|---|
| 9,837,673 | B2 | 12/2017 | Kim | |
| 2006/0246332 | A1* | 11/2006 | Higashi | H01M 8/0267 429/432 |
| 2018/0205098 | A1 | 7/2018 | Vanderwees | |
| 2022/0181655 | A1* | 6/2022 | Ahn | B01D 63/04 |

FOREIGN PATENT DOCUMENTS

| | | | |
|---|---|---|---|
| JP | S59110971 | A | 6/1984 |
| JP | 59-030284 | Y | 8/1984 |
| JP | S62-46879 | U | 3/1987 |
| JP | 3698038 | B2 | 9/2005 |
| JP | 2006120340 | A | 5/2006 |
| JP | 4413587 | B2 | 2/2010 |
| JP | 2010038278 | A | 2/2010 |
| KR | 20090013304 | A | 2/2009 |
| KR | 20090057773 | A | 6/2009 |
| KR | 20090128005 | A | 12/2009 |
| KR | 20100074835 | A | 7/2010 |
| KR | 20100108092 | A | 10/2010 |
| KR | 20100131631 | A | 12/2010 |
| KR | 20110001022 | A | 1/2011 |
| KR | 20110006122 | A | 1/2011 |
| KR | 20110006128 | A | 1/2011 |
| KR | 20110021217 | A | 3/2011 |
| KR | 20110026696 | A | 3/2011 |
| KR | 20110063366 | A | 6/2011 |
| KR | 20140076385 | A | 6/2014 |
| KR | 20160073524 | A | 6/2016 |
| KR | 20160078590 | A | 7/2016 |
| KR | 20200055345 | A | 5/2020 |
| KR | 10-2020-0122260 | A | 10/2020 |
| KR | 20200122260 | A | 10/2020 |
| WO | 2020-213990 | A1 | 10/2020 |

OTHER PUBLICATIONS

JP OA dated Jun. 10, 2024.
Office Action from Japanese Patent Office, dated Nov. 18, 2024.
Examination report dated Aug. 29, 2024.
Extended European Search Report dated Feb. 17, 2025.
JP Notice Of Allowance dated Jun. 2, 2025.

* cited by examiner

FUEL CELL SYSTEM CAPABLE OF ADJUSTING BYPASS FLOW RATE

CROSS REFERENCE TO RELATED APPLICATION

This application is a National Stage filing under 35 U.S.C. 371 of International Application No. PCT/KR2022/001359 filed on Jan. 26, 2022, and claims priority to Korean Patent Application No. 10-2021-0014737 filed on Feb. 2, 2021, the disclosures of which is incorporated herein by reference in its entirety.

TECHNICAL FIELD

The present invention relates to a fuel cell system, and more particularly, to a fuel cell system capable of adjusting a bypass flow rate that is capable of automatically adjusting a bypass flow rate depending on a temperature of a dry gas flowing into the inside from a blower.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a humidifier can be reduced.

A selective permeable membrane used in the membrane humidification scheme is preferably a hollow fiber membrane having a large permeable area per unit volume when a module is formed. That is, when a humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an off-gas discharged with a high temperature from the fuel cell can be recovered and can be reused through the humidifier.

FIG. 1 is a diagram illustrating a fuel cell system according to the related art.

As illustrated in FIG. 1, the fuel cell system of the related art includes a blower B, a membrane humidifier 10, a fuel cell stack S, flow paths P1 to P3 that connect these, and an adjustment valve 15. P1 denotes a supply flow path that connects the blower B to the membrane humidifier 10, P2 denotes a bypass flow path that bypasses the membrane humidifier 10 and connects the blower B to the fuel cell stack S, and P3 denotes a stack flow path that connects the membrane humidifier 10 to the fuel cell stack S. Here, 'connect' includes not only "direct connection", but also "indirect connection with another part interposed therebetween".

The membrane humidifier 10 includes a humidification module 11 in which moisture exchange occurs between a dry gas supplied from the blower B and wetting air (off-gas) discharged from the fuel cell stack S, and caps 12 (12*a* and 12*b*) coupled to both ends of the humidification module 11.

A dry gas inlet 13 is formed in one cap 12*a* between the caps 12 to supply the dry gas supplied from the blower B to the humidification module 11, and a dry gas outlet 14 is formed in the other cap 12*b* to supply the air humidified by the humidification module 11 to the fuel cell stack S.

The humidification module 11 includes a mid-case 11*a* having an off-gas inlet 11*aa* and an off-gas outlet 11*ab*, and a plurality of hollow fiber membranes 11*b* in the mid-case 11*a*. Both ends of a bundle of hollow fiber membranes 11*b* are fixed to potting portions 11*c*. The potting portions 11*c* are generally formed by curing a liquid polymer such as a liquid polyurethane resin through a casting scheme.

The dry gas supplied from the blower B flows along hollows of the hollow fiber membranes 11*b*. The off-gas flowing into the mid-case 11*a* through the off-gas inlet 11*aa* comes into contact with outer surfaces of the hollow fiber membranes 11*b*, and then, is discharged from the mid-case 11*a* through the off-gas outlet 11*ab*. When the off-gas comes into contact with the outer surfaces of the hollow fiber membranes 11*b*, moisture contained in the off-gas permeates the hollow fiber membranes 11*b* to humidify the dry gas flowing along the hollows of the hollow fiber membranes 11*b*.

Inner spaces of the caps 12 are in fluid communication only with the hollows of the hollow fiber membranes 11*b*, and should be completely blocked from an inner space of the mid-case 11*a*. Otherwise, air leakage occurs due to a pressure difference, an amount of humidified air supplied to the fuel cell stack is reduced, and efficiency of power generation of the fuel cell is degraded.

Meanwhile, a part of the dry gas supplied from the blower B through the supply flow path P1 is supplied to the membrane humidifier 10 through the dry gas inlet 13, and the remaining dry gas flows through the bypass flow path P2 bypassing the membrane humidifier 10 and joins the stack flow path P3, depending on an output magnitude of the fuel cell stack S. Air humidified in the membrane humidifier 10 and air not humidified through the bypass flow path P2 are mixed in the stack flow path P3 and supplied to the fuel cell stack S.

A bypass flow rate bypassing through the bypass flow path P2 is controlled by the adjustment valve 15 installed on the bypass flow path P2. A degree of opening and closing of the adjustment valve 15 may be adjusted depending on the output magnitude of the fuel cell stack S.

Since such an adjustment valve 15 should include a valve plate that is opened or closed by pivoting, and an adjustment tool that adjusts an opening and closing angle of the valve plate depending on to a manipulation of a user or a signal from a controller, and also separately include a detection sensor that detects the output magnitude of the fuel cell stack S for opening and closing adjustment of the adjustment valve 15, there is a disadvantage in that a cost increases and the fuel cell system becomes complicated due to an increased number of parts.

DISCLOSURE

Technical Problem

An object of the present invention is to provide a fuel cell system capable of adjusting a bypass flow rate, which can automatically adjust the bypass flow rate depending on a temperature of a dry gas flowing into the inside from the blower.

Technical Solution

A fuel cell system capable of adjusting a bypass flow rate according to an embodiment of the present invention includes a blower configured to supply a dry gas through a supply flow path; a dry gas inlet configured to supply at least a part of the dry gas supplied from the blower to a membrane humidifier; a bypass flow path configured to supply at least a part of the dry gas supplied from the blower to a fuel cell stack by bypassing the membrane humidifier; and a bypass flow rate adjustment portion formed in the bypass flow path and configured to adjust a degree of opening of the bypass flow path depending on a temperature of the dry gas flowing into the inside from the blower.

In the fuel cell system capable of adjusting a bypass flow rate according to the embodiment of the present invention, the bypass flow rate adjustment portion may include a thermal expansion material contracting in a first temperature range and expanding in a second temperature range greater than the first temperature range.

In the fuel cell system capable of adjusting a bypass flow rate according to the embodiment of the present invention, the bypass flow rate adjustment portion may be formed in a ring shape on an inner wall of the bypass flow path.

In the fuel cell system capable of adjusting a bypass flow rate according to the embodiment of the present invention, the bypass flow rate adjustment portion may be inserted in a ring shape into an annular fixing groove formed on an inner wall of the bypass flow path.

In the fuel cell system capable of adjusting a bypass flow rate according to an embodiment of the present invention, the supply flow path and the bypass flow path may be formed in the same direction.

In the fuel cell system capable of adjusting a bypass flow rate according to an embodiment of the present invention, the membrane humidifier may include a mid-case, caps fastened to the mid-case, and a humidification module disposed inside the mid-case to accommodate a plurality of hollow fiber membranes.

In the fuel cell system capable of adjusting a bypass flow rate according to an embodiment of the present invention, the humidification module may include at least one cartridge including an inner case configured to accommodate a plurality of hollow fiber membranes and potting portions formed at ends of the inner case.

In the fuel cell system capable of adjusting a bypass flow rate according to the embodiment of the present invention, the dry gas inlet may be formed to be connected to the supply flow path connecting the blower to the membrane humidifier and the bypass flow path.

In the fuel cell system capable of adjusting a bypass flow rate according to the embodiment of the present invention, the dry gas inlet may be perpendicular to the supply flow path.

Other specific matters of implementation examples according to various aspects of the present invention are included in the detailed description below.

Advantageous Effects

With the fuel cell system according to the embodiment of the present invention, it is possible to automatically adjust the degree of opening of the bypass flow path depending on an output situation of the fuel cell stack without additional parts such as sensors or valves. Accordingly, it is possible to reduce a manufacturing cost and further simplify the fuel cell system due to a reduced number of parts.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are for the purpose of describing specific embodiments only and are not intended to limit the present invention. The singular expressions "a," "an" and "the" include the plural expressions, unless the context clearly indicates otherwise. It will be understood that the terms "include" or "have" herein specify the presence of features, numbers, steps, operations, components, parts or combinations thereof described herein, but do not preclude the presence or addition of one or more other features, numbers, steps, operations, components, parts or combinations thereof. Hereinafter, a fuel cell system according to embodiments of the present invention will be described with reference to the drawings.

Figure 1:
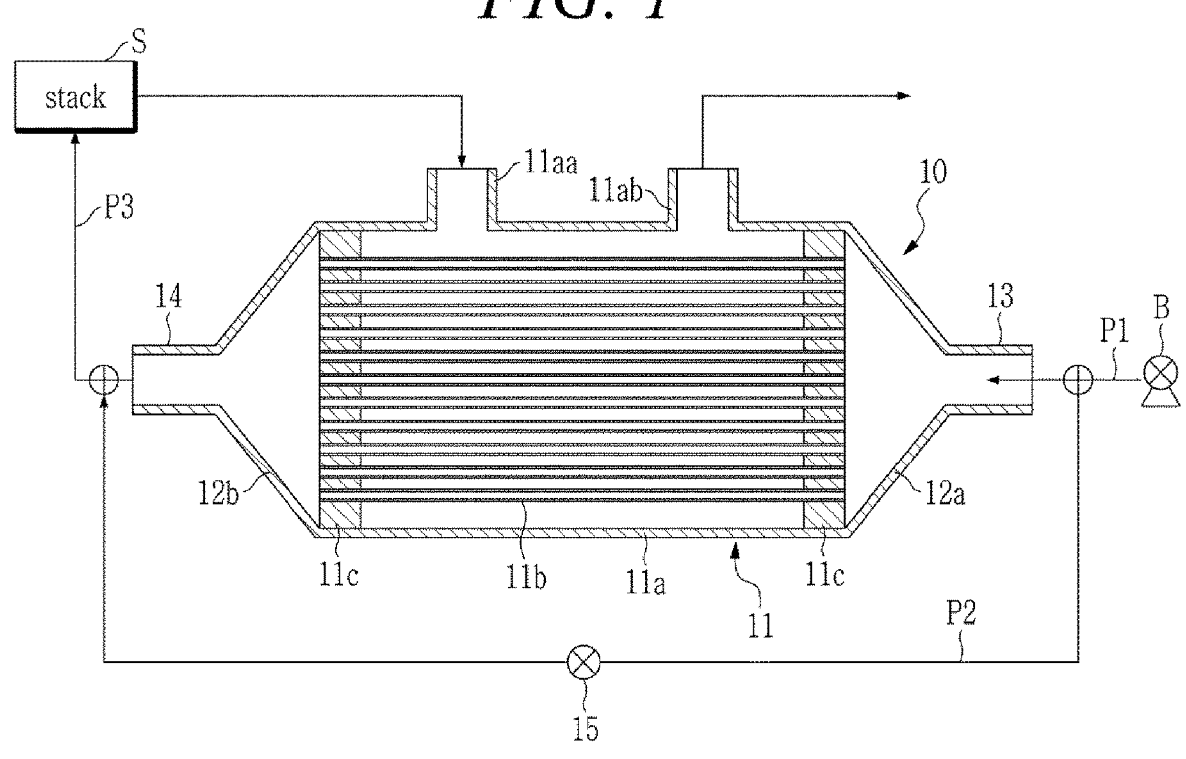
FIG. 1 is a diagram illustrating a fuel cell system according to the related art.
Figure 2:
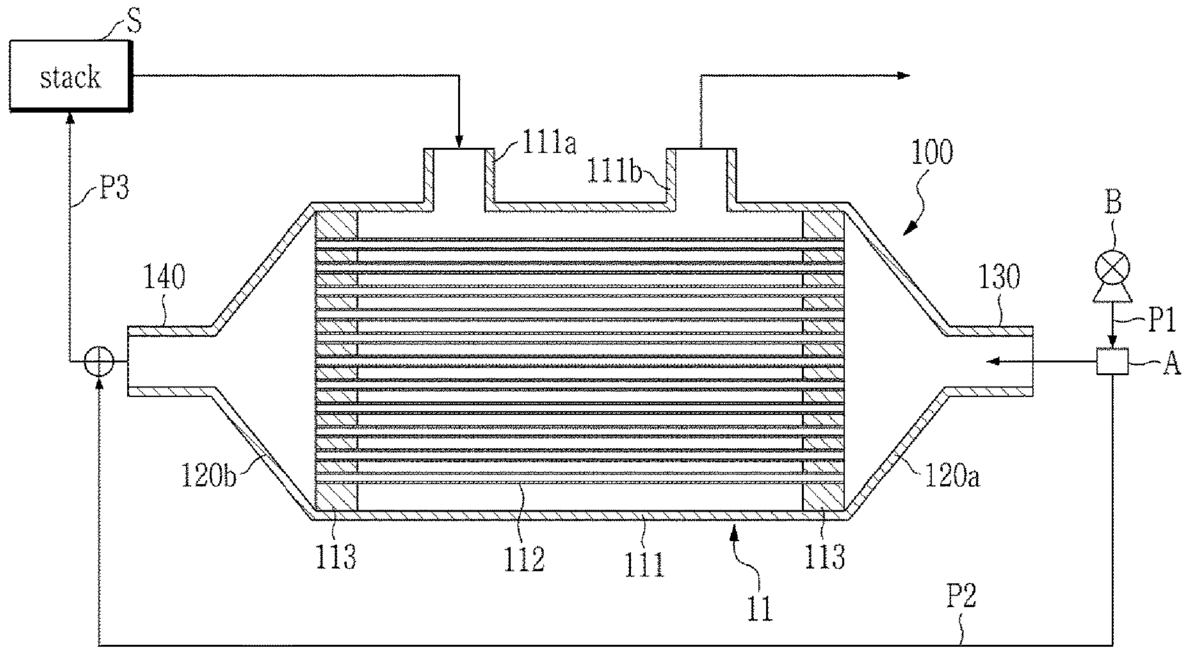
FIG. 2 is a diagram illustrating a fuel cell system according to an embodiment of the present invention.

FIG. 2 is a diagram illustrating a fuel cell system capable of adjusting a bypass flow rate (hereinafter referred to as a "fuel cell system") according to an embodiment of the present invention.

Figure 3:
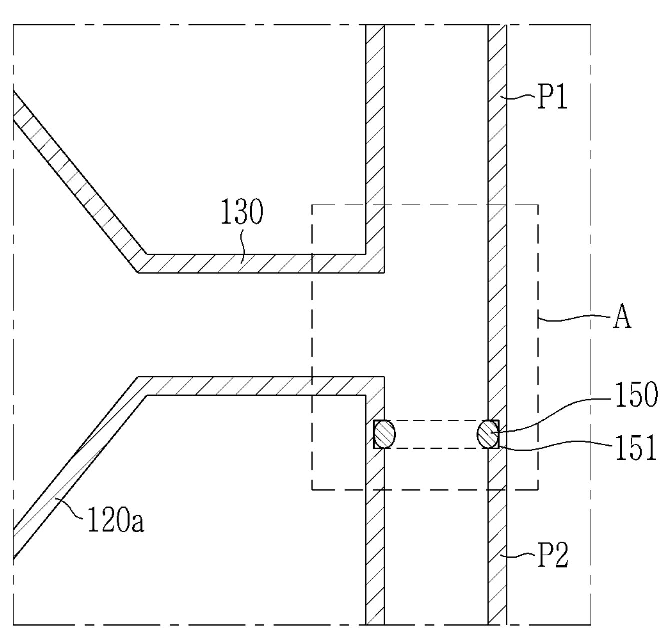
FIG. 3 is an enlarged view of a bypass flow rate adjustment portion of the fuel cell system according to the embodiment of the present invention.

As illustrated in FIG. 2, the fuel cell system according to an embodiment of the present invention includes a blower B, a membrane humidifier 100, a fuel cell stack S, flow paths P1 to P3 that connect these, and a bypass flow rate adjustment portion 150 (see FIG. 3).

The blower B collects air in an atmosphere and supplies the air to the membrane humidifier 100. An output magnitude of the blower B may be determined depending on an output magnitude of the fuel cell stack S. Optionally, a filter (not illustrated) that removes fine dust may be installed before the blower B, and a cooler (not illustrated) that cools a dry gas supplied to the membrane humidifier 100 may be installed between the blower B and the membrane humidifier 100.

The membrane humidifier 100 humidifies the dry gas and supplies the dry gas to the fuel cell stack S. The membrane humidifier 100 includes a humidification module 110 that humidifies the dry gas supplied from the blower B with moisture in an off-gas discharged from the fuel cell stack S. Both ends of the humidification module 110 are coupled to caps 120 (120*a* and 120*b*). The humidification module 110 and the cap 120 may be separately formed or may be integrally formed.

A dry gas inlet 130 is formed in the one cap 120*a* between the caps 120 to supply the dry gas supplied from the blower B to the humidification module 110, and a dry gas outlet 140 is formed in the other one cap 120*b* to supply air humidified by the humidification module 110 to the fuel cell stack S.

The dry gas inlet 130 may be connected to a supply flow path P1 that connects the blower B to the membrane humidifier 10 and a bypass flow path P2 that connects the blower B to the fuel cell stack S. The dry gas outlet 140 may be connected to a stack flow path P3 that connects the membrane humidifier 10 and the fuel cell stack S.

The humidification module 110 is a device in which moisture exchange between the dry gas supplied from the blower B and the off-gas occurs, and includes a mid-case 111 having an off-gas inlet 1111*a* and an off-gas outlet 111*b*, and a plurality of hollow fiber membranes 112 in the mid-case 111. Both ends of a bundle of hollow fiber membranes 112 are fixed to potting portions 113.

Alternatively, the humidification module 110 may include at least one cartridge including the plurality of hollow fiber membranes 112 and the potting portions 113 that fix the hollow fiber membranes 112 to each other. In this case, the hollow fiber membranes 112 and the potting portions 113 may be formed in a separate cartridge case (an inner case). In this case, the hollow fiber membranes 112 may be accommodated in the inner case, and the potting portions 113 may be formed at ends of the inner case. When the humidification module 110 includes the cartridge, a resin layer for fixing the cartridge may be formed between both ends of the cartridge and the mid-case 111, or a gasket assembly for airtight coupling through a mechanical assembly may be further included.

The mid-case 111 and the cap 120 may be independently formed of hard plastic or metal, and may have a circular or polygonal cross section in a width direction. The "circular" include oval, and "polygonal" includes polygonal with rounded corners. Examples of the hard plastic may include polycarbonate, polyamide (PA), polyphthalamide (PPA), and polypropylene (PP).

The hollow fiber membranes 112 may include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these, and the potting portions 113 may be formed by curing a liquid resin such as a liquid polyurethane resin through a casting scheme such as deep potting or centrifugal potting.

The dry gas supplied from the blower B flows along hollows of the hollow fiber membranes 112. The off-gas flowing into the mid-case 111 through the off-gas inlet 111*a* comes into contact with outer surfaces of the hollow fiber membranes 112 and then is discharged from the mid-case 111 through the off-gas outlet 111*b*. When the off-gas contacts the outer surfaces of the hollow fiber membranes 112, moisture contained in the off-gas permeates the hollow fiber membranes 112 to humidify the dry air flowing along the hollows of the hollow fiber membranes 112.

Meanwhile, a flow rate of the dry gas flowing into the dry gas inlet 130 from the blower B can be adjusted by the bypass flow rate adjustment portion 150 that adjusts a degree of opening of the bypass flow path P2 depending on a temperature of the dry gas flowing into the inside from the blower. A degree of opening and closing of the bypass flow rate adjustment portion 150 may be automatically determined depending on the output magnitude of the fuel cell stack S without a separate additional component. Accordingly, the number of parts of the overall system can be reduced, a size of the system can be reduced, and a manufacturing cost can be reduced. The bypass flow rate adjustment portion 150 will be described in detail with reference to FIG. 3.

FIG. 3 is a view illustrating the bypass flow rate adjustment portion 150 of the fuel cell system according to the embodiment of the present invention, and is an enlarged view of a part "A" in FIG. 2.

As illustrated in FIG. 3, the bypass flow rate adjustment portion 150 may be formed in the bypass flow path P2 to adjust the degree of opening of the bypass flow path P2 depending on the temperature of the dry gas flowing into the inside from the blower B.

The bypass flow path P2 is a flow path that bypasses the membrane humidifier 100 and connects the blower B to the fuel cell stack S. The dry gas inlet 130 may be a part of the cap 120*a* formed to be connected to the blower B or may be a separate flow path that connects the blower B to the cap 120*a*. The supply flow path P1 connecting the blower B to the membrane humidifier 10 may be formed at a predetermined angle, such as a right angle, with respect to the dry gas inlet 130.

The bypass flow rate adjustment portion 150 may be formed on an inner wall of the bypass flow path P2. The bypass flow rate adjustment portion 150 may be formed in a ring shape on the inner wall of the bypass flow path P2.

Alternatively, an annular fixing groove 151 may be formed on the inner wall of the bypass flow path P2, and the bypass flow rate adjustment portion 150 may be formed in a ring shape and inserted into and fixed to the annular fixing groove 151.

The bypass flow rate adjustment portion 150 may be made of a material that thermally expands depending on the temperature of the dry gas. The bypass flow rate adjustment portion 150 may include a thermal expansion material that contracts in a first temperature range and expands in a second temperature range greater than the first temperature range. That is, the bypass flow rate adjustment portion 150 may include a thermal expansion material that contracts at a low temperature and expands at a high temperature.

The supply flow path P1 and the bypass flow path P2 are preferably formed in the same direction. When the supply flow path P1 and the bypass flow path P2 are formed in the same direction, the bypass flow rate adjustment portion 150 faces a direction in which the dry gas flows, and thus, the contraction or expansion depending on a temperature can be effectively performed.

The dry gas supplied through the supply flow path P1 is distributed to the dry gas inlet 130 and the bypass flow path P2. In this case, an amount of the dry gas supplied to the membrane humidifier 100 through the dry gas inlet 130 is determined according to an amount of the dry gas flowing through the bypass flow path P2. Further, a flow rate to the bypass flow path P2 is determined by the bypass flow rate adjustment portion 150. This will be described with reference to FIGS. 4 and 5.

Figure 4:
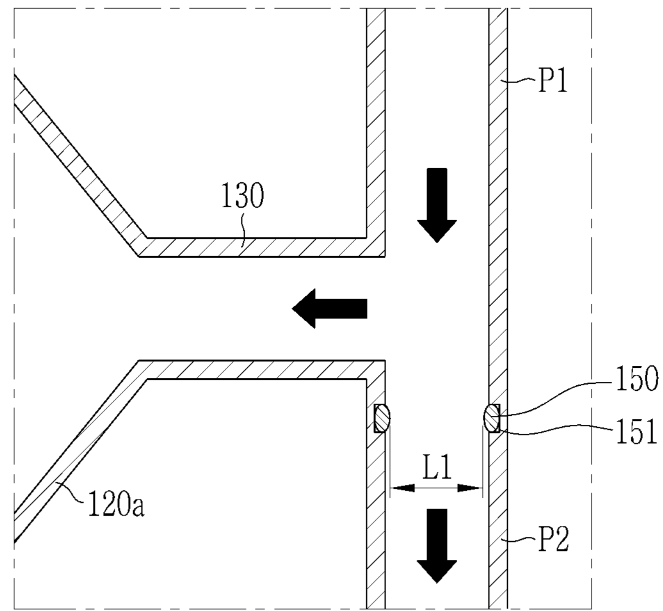
FIG. 4 is a diagram illustrating an operating state of the bypass flow rate adjustment portion of FIG. 3 in a low output environment.

FIG. 4 is a diagram illustrating an operating state of the bypass flow rate adjustment portion 150 in a low output environment. When the output of the fuel cell stack S is generally lower than 40 kW, this can be referred to as a low output environment. In the low output environment, a relatively low temperature dry gas is supplied from the blower B. Here, the low temperature may be in a first temperature range lower than about 50° C.

Since the dry gas is at a low temperature, the bypass flow rate adjustment portion 150 relatively contracts so that an opening diameter of the bypass flow path P2 becomes L1. Therefore, a relatively large amount of dry gas flows through the bypass flow path P2 as compared with a high output environment, and a relatively small amount of low temperature dry gas is supplied to the membrane humidifier 100.

Figure 5:
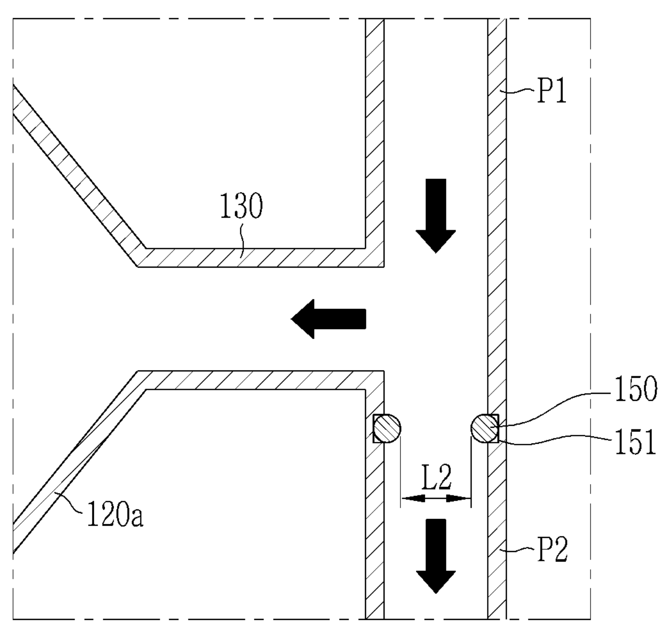
FIG. 5 is a diagram illustrating an operating state of the bypass flow rate adjustment portion of FIG. 3 in a high output environment.

FIG. 5 is a diagram illustrating an operating state of the bypass flow rate adjustment portion 150 in a high output environment. When the output of the fuel cell stack S is generally equal to or higher than 40 KW, this can be referred to as a high output environment. In the high output environment, a relatively high temperature dry gas is supplied from the blower B. Here, the high temperature may be in a range of about 50 to 150° C. and may be a second temperature range greater than the first temperature range.

Since the dry gas is at a high temperature, the bypass flow rate adjustment portion 150 expands and the opening diameter of the bypass flow path P2 becomes L2 smaller than L1. Therefore, a relatively small amount of dry gas flows through the bypass flow path P2 as compared with the low output environment, and a relatively large amount of high temperature dry gas is supplied to the membrane humidifier 100.

In the fuel cell system according to the embodiment of the present invention as described above, it is possible for the bypass flow rate adjustment portion 150 to automatically adjust the degree of opening of the bypass flow path P2 depending on an output situation of the fuel cell stack S without additional parts such as sensors or valves, and it is possible to reduce a manufacturing cost and further simplify the fuel cell system due to a reduced number of parts.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

DETAILED DESCRIPTION OF MAIN ELEMENTS

- 100: fuel cell system 110: humidification module
- 120: cap 130: dry gas inlet
- 140: dry gas outlet 150: bypass flow rate adjustment portion
- B: blower S: fuel cell stack
- P1: supply flow path P2: bypass flow path
- P3: stack flow path

The invention claimed is:

1. A fuel cell system capable of adjusting a bypass flow rate comprising:

a blower configured to supply a dry gas through a supply flow path;

a dry gas inlet configured to supply at least a part of the dry gas supplied from the blower to a membrane humidifier;

a bypass flow path configured to supply at least a part of the dry gas supplied from the blower to a fuel cell stack by bypassing the membrane humidifier; and a bypass flow rate adjustment portion formed in the bypass flow path and configured to adjust a degree of opening of the bypass flow path depending on a temperature of the dry gas flowing into the inside from the blower, wherein the bypass flow rate adjustment portion is formed in a ring shape and is inserted into and fixed in an annular fixing groove formed on an inner wall of the bypass flow path.

2. The fuel cell system capable of adjusting a bypass flow rate of claim 1, wherein the bypass flow rate adjustment portion includes a thermal expansion material contracting in a first temperature range and expanding in a second temperature range greater than the first temperature range.

3. The fuel cell system capable of adjusting a bypass flow rate of claim 1, wherein the supply flow path and the bypass flow path are formed in the same direction.

4. The fuel cell system capable of adjusting a bypass flow rate of claim 1, wherein the membrane humidifier includes a mid-case, caps fastened to the mid-case, and a humidification module disposed inside the mid-case to accommodate a plurality of hollow fiber membranes.

5. The fuel cell system capable of adjusting a bypass flow rate of claim 4, wherein the humidification module includes at least one cartridge including an inner case configured to accommodate the plurality of hollow fiber membranes and potting portions formed at ends of the inner case.

6. The fuel cell system capable of adjusting a bypass flow rate of claim 4, wherein the dry gas inlet is formed to be connected to the supply flow path connecting the blower to the membrane humidifier and the bypass flow path.

7. The fuel cell system capable of adjusting a bypass flow rate of claim 6, wherein the dry gas inlet is perpendicular to the supply flow path.

* * * * *